United States Patent
Vågstedt

(10) Patent No.: US 6,922,139 B2
(45) Date of Patent: Jul. 26, 2005

(54) INDICATING INSTRUMENT FOR VEHICLE SPEED INDICATOR

(75) Inventor: Nils-Gunnar Vågstedt, Täby (SE)

(73) Assignee: Scania CV AB (publ) (SE)

( * ) Notice: Subject to any disclaimer, the term of this patent is extended or adjusted under 35 U.S.C. 154(b) by 49 days.

(21) Appl. No.: 10/445,634

(22) Filed: May 23, 2003

(65) Prior Publication Data

US 2003/0206098 A1 Nov. 6, 2003

Related U.S. Application Data

(63) Continuation-in-part of application No. PCT/SE01/02815, filed on Dec. 19, 2001.

(30) Foreign Application Priority Data

Dec. 28, 2000 (SE) .............................. 0004878

(51) Int. Cl.$^7$ ................................................. B60Q 1/00
(52) U.S. Cl. .................... 340/438; 340/425.5; 340/441; 340/461; 701/93; 701/301; 180/170; 116/286
(58) Field of Search ............................. 340/425.5, 441, 340/461, 438, 435, 466, 467, 471, 901, 903, 904; 180/170; 116/284, 286, 288; 701/93, 96, 300, 301

(56) References Cited

U.S. PATENT DOCUMENTS

| | | | |
|---|---|---|---|
| 5,815,072 A | * | 9/1998 | Yamanaka et al. .......... 340/461 |
| 6,226,588 B1 | * | 5/2001 | Teramura et al. ............. 701/93 |
| 6,320,500 B1 | | 11/2001 | Adelsson et al. |
| 6,324,463 B1 | * | 11/2001 | Patel ............................ 701/93 |
| 6,366,845 B1 | * | 4/2002 | Kannonji ..................... 701/96 |
| 6,373,400 B1 | * | 4/2002 | Fujita et al. ................ 340/901 |

FOREIGN PATENT DOCUMENTS

| | | |
|---|---|---|
| JP | 11-245686 | 9/1999 |
| SE | 51098 C2 | 2/1999 |

* cited by examiner

Primary Examiner—Davetta W. Goins
(74) Attorney, Agent, or Firm—Ostrolenk, Faber, Gerb & Soffen, LLP

(57) ABSTRACT

An indicating instrument intended to be fitted in a vehicle and serve for vehicle speed indication (in km/h). The instrument has an instrument panel with a seed scale and a needle pointer which indicates the speed of the vehicle fitted with the instrument panel also incorporates an illuminable indicating area which is composed of firable/extinguishable light emitting means and which varies in extent depending on at least two different speed values, one of which is a speed relating to the vehicle fitted with the instrument and other is a speed pertaining to another vehicle. The indicating area has at least two separate demarcating edges which form indicating delineations with respect to the speed scale on the instrument panel.

12 Claims, 1 Drawing Sheet

INDICATING INSTRUMENT FOR VEHICLE SPEED INDICATOR

CROSS REFERENCE TO RELATED APPLICATIONS

This application is a continuation-in-part of PCT application number PCT/SE01/02815 filed Dec. 19, 2001, which claims priority of Swedish application number 0004878-5, filed Dec. 28, 2000. The entirety of this application is hereby incorporated by reference.

BACKGROUND OF THE INVENTION

The present invention relates to a vehicle speed indicating instrument particularly adapted to indicate the speeds of the vehicle containing the instrument and another vehicle. Such an indicating instrument, which is adapted to be fitted in a vehicle, serves to indicate at least one vehicle speed, usually the speed of motion of the vehicle in which the instrument is fitted. The instrument has an instrument panel with a speed scale and needle-type pointer, the position of which relative to the speed scale indicates the vehicle's speed of motion.

STATE OF THE ART

A vehicle, particularly a motor vehicle, intended to operate on roads in general or on land has to be provided with a speed monitoring instrument (speedometer) situated within the driver's field of vision. Such a speedometer usually shows the vehicle speed in km/h by the position of a pointer relative to a speed scale graduated in km/h on the instrument panel.

Also known is a speedometer which primarily shows the vehicle's speed of motion by means of a movable needle pointer but may also be designed to provide the vehicle's driver with other supplementary visual information.

An example of such an indicating instrument is described in U.S. Pat. No. 6,320,500. The instrument described there involves the use of a pointer supported centrally on the instrument panel to show the vehicle's road speed, while an array of indicators (individually controllable light sources) is used for indicating supplementary information. This supplementary information takes the form of the same vehicle's relative speed with respect to another vehicle in front, i.e. a vehicle which is ahead of, and traveling in the same direction as, the vehicle which is fitted with the instrument. The light sources which constitute the indicators consist of light emitting diodes (LEDs) which, when fired simultaneously, form an arcuate row of points of light which is composed of LED points and whose longitudinal extent along the speed scale shows by how many km/h the speed of the vehicle fitted with the instrument differs from that of the vehicle in front, i.e. the value of the relative speed between the two vehicles.

A disadvantage of this known indicating instrument is that it can only provide one item of supplementary information (the relative speed) in addition to the road speed of the vehicle fitted with the instrument.

A so-called Adaptive Cruise Control System (ACC or AICC) makes it possible to register a vehicle in front, its speed and the distance between it and a vehicle fitted with the system. The system then adapts the latter vehicle's speed so that it will coincide with the speed of the vehicle in front. The distance between the two vehicles is adapted according to a predetermined time interval which, combined with the speed of the vehicle in front, makes it possible to determine the desirable mutual distance between the vehicles. Presentation of this kind of information to the driver of the vehicle fitted with the system is important from a safety point of view (active safety, ergonomics).

OBJECTS OF THE INVENTION

The primary object of the invention is to provide an indicating instrument which not only shows by means of a needle-type pointer the speed of motion of a vehicle which is fitted with the instrument but also provides the driver quickly and clearly with such supplementary information concerning a vehicle in front, thereby increasing his attentiveness and consequently contributing to safer and more comfortable driving, e.g., by obviating the need for sudden speed changes (particularly deceleration).

A relating second object of the invention is to provide such an indicating instrument whereby supplementary information is presented to the driver without using any needle pointer.

A further object of the invention is that the indicating instrument could be used for indicating at least two further vehicle-related speed parameters (in addition to the road speed of the vehicle fitted with the instrument), at least one of which should be able to provide supplementary information concerning the vehicle fitted with the instrument.

DESCRIPTION OF THE INVENTION

According to the invention, the objects mentioned above may be achieved with an indicating instrument of the kind indicated in the introduction which exhibits the features of including an illuminable indicating area, with respective extents varying dependent upon a speed related to the vehicle with the instrument and upon a speed of another vehicle and the indicating area has demarcating edges forming indications with respect to the speed scales. Light emitting elements, which may be in the form of light emitting diodes, are operable to illuminate the area between the demarcating edges.

What primarily distinguishes the invention is that the instrument panel incorporates not only the needle pointer which indicates the road speed of the vehicle fitted with the instrument but also an indicating area which becomes visible to the driver (the observer) when it lights up. The visible extent of this indicating area values depending on at least two different speed values (speed parameters). One of these two speed values is a speed which in some ways pertains to (or is related to) the vehicle fitted with the instrument, while the other is a speed which applies to another vehicle. The illuminable indicating area has at least two different and clearly visible demarcating edges, the contrasting effect of which relative to the instrument panel makes them form indicating delineations with respect to the speed scale of the instrument panel.

The instrument panel is preferably provided with an array of firable light emitting means situated appropriately within a surface area of the instrument panel relatively near to the edges. The illuminated indicating area thus consists of whichever of the array of light emitting means are fired (i.e. emit light) at the particular moment. The expression "light emitting means" in this context means quite generally a light source which, when fired/activated, emits visible light and can therefore be used to provide visual information.

Examples of such light emitting means which are suitable in this context include light emitting diodes (LEDs), floating crystals and other more or less "spot-shaped" light generating means or units. In cases where LEDs are used, they need to have at least two different operating states, the diodes being fired in one operating state and extinguished in the other. In certain contexts it may be appropriate to use LEDs which light up in a first colour in one operating state, and in a second colour in another operating state. Instead of LEDs which light up in different colours in different operating states, it is possible to conceive of using LEDs which light up with clearly different intensities in their different operating states.

The speed pertaining to a vehicle fitted with the instrument may be a speed which is desirable for some particular reason (i.e. a set speed) for the vehicle, and the speed applicable to another vehicle may be the speed of a vehicle which is ahead of the vehicle fitted with the instrument.

In the case of indicating instruments with a circular instrument panel, it is probably often appropriate that the illuminable indicating area should take the form of a relatively narrow strip of indicating area in the form of a circular arc. The short sides of this area (i.e. its ends) then constitute the indicating edges whose positions relative to the speed scale of the instrument panel indicate readable speed values. One indicating edge may then be used to show a set speed for the vehicle fitted with the instrument, while the other indicating edge is used to indicate the speed of a vehicle in front. Examples of set speeds for the vehicle fitted with the instrument include the maximum permissible speed within applicable speed limits, the most economic traveling speed (lowest fuel consumption), the appropriate average speed for the vehicle to complete, with a certain margin, a certain journey within a certain time, a last selected cruise control speed, and so on.

BRIEF DESCRIPTION OF THE DRAWINGS

The instrument will now be exemplified below by describing an embodiment of an indicating instrument according to the invention, depicted in the attached drawings.

DETAILED DESCRIPTION OF PREFERRED EMBODIMENTS OF THE INVENTION

Figure 1:
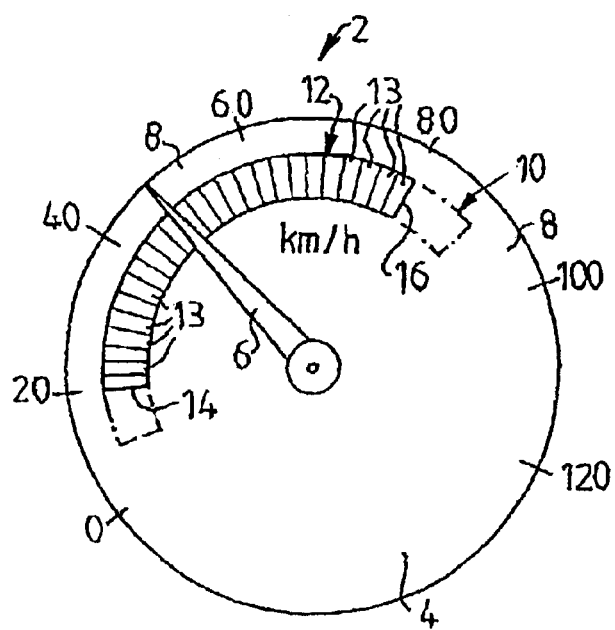
FIG. 1 consists entirely of a schematic diagram of an indicating instrument of a circular type.
Figure 2:
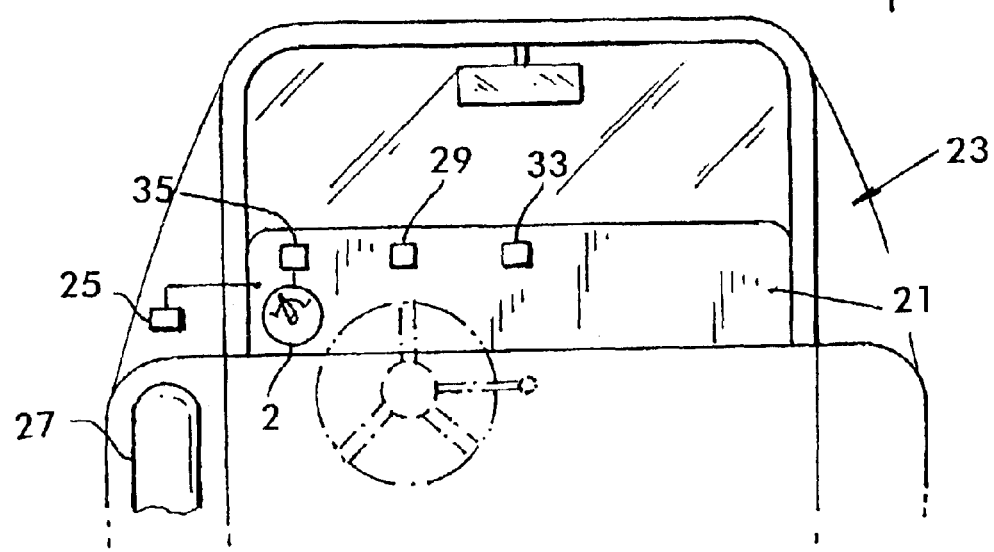
FIG. 2 is schematic view of a system including the indicating instrument of a type in FIG. 1.

The indicating instrument 2 depicted in the drawings is of a circular type and has an instrument panel 4 with a centrally supported needle pointer 6, the tip of which sweeps across a speed scale 8 at or adjacent to the outer edge of the instrument panel 4. The indicating instrument is a speedometer intended for a dashboard in a motor vehicle and provided with a speed scale 8 graduated in km/h. On the instrument panel 4 there is a strip of indicating area 10 in the form of a curving circular arc capable of maximum illumination, which in the example depicted extends approximately from speed 10 km/h to speed 90 km/h. An activated (i.e. illuminated) portion 12 of this maximum indicating area 10 is depicted as extending approximately from speed 20 km/h to speed 80 km/h.

The indicating area 10 depicted is composed of an array of illuminable (firable/extinguishable) light emitting means 13 which in this case take the form of light emitting diodes, which are therefore placed side by side in an arcuate row (or in two or more concentric rows situated close to one another). The thus momentarily illuminated portion 12 of the maximum-illumination indicating area 10 has an arcuate longitudinal extent whose magnitude depends on two different speed values, namely a lower limit value indicated by the "lower" demarcating edge (short side) 14 of the area 12, and an upper limit value indicated by the "upper" demarcating edge (short side) 16 of the area 12. The lower limit value (at 14) is in this case the speed of motion of another vehicle which is ahead of, and traveling in the same direction as, the vehicle fitted with the instrument.

The upper limit value (at 16) is a set speed (i.e. a desired speed) for the vehicle fitted with the instrument. Depending on whether these two speeds increase or decrease, the demarcating/indicating edges 14 and 16 will shift to lower or higher speed values on the speed scale 8. The shifting of these limit values takes place by the firing or extinguishing of more or fewer of the means 13 which constitute the array of light emitting means.

The indicating instrument 2 described herein maybe used in any automotive vehicle. The indicating instrument 2 is disposed on an instrument panel or dashboard 21 of a vehicle 23. A first sensor 25 communicates with one wheel 27 of the vehicle 23 in which the instrument is disposed for detecting the speed of that vehicle.

A separate second sensor 29 in the vehicle 23 is directed forwardly, e.g., a now conventional infrared distance detector used on vehicles, and it detects the distance between the vehicle 23 having the instrument 2 and another vehicle 31 moving in front. A microprocessor 33 compares variations in the detected distance between the vehicle 23 having the instrument and the vehicle 31 in front with the measured speed of the vehicle 23 having the instrument and from this data the microprocessor determines the then current speed of the vehicle 31 in front and provides that speed information for setting the demarcating edge 16. The microprocessor 33 or the vehicle operation may preselect a speed for the vehicle 23 and provide that information for setting the demarcating edge 16. The demarcating edge 14 forms an indicating edge denoting a desired speed for the vehicle 23 with the instrument. The demarcating edge 14 forms an indicating edge to indicate the speed of a vehicle 31 traveling on the carriageway and particularly the vehicle 31 in front of the vehicle 23 that is fitted with the instrument.

The first sensor 25 for the vehicle and the microprocessor 33 communicate with a control 35 for the light emitting diodes to cause the selective firing or extinguishment of the diodes (or the firing of different colors in the diodes) for defining the demarcating edges 14 and 16, based upon the constantly changing measured speed of the other vehicle and perhaps variation of the predetermined speed. The controlled firing causes apparent repositioning of the demarcating edges 14 and 16 with reference to the speed scale 8. The operator of the vehicle 23 can then adjust the actual speed of the vehicle, indicated by the pointer 6 and scale 8, to a selected speed or a set speed for the vehicle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vehicle speed indicating instrument comprising an installment panel and a speed indicator for indicating the vehicle speed;

an illuminable indicating area on the instrument panel and having a variable extent variable dependent upon indicating at least first and second speed values, wherein the first speed value is related to a first vehicle in which the indicating instrument is fitted and the second speed value is related to another vehicle, the illuminable indicating area having respective demarcating edges each corresponding to the respective one of the speed values, and the edges also forming indicating delineations with respect to the speed indicator on the instrument panel.

2. The indicating instrument of claim 1, wherein the speed indicator comprises a speed scale on the instrument panel and a moveable needle pointer which indicates the vehicle speed on the speed scale.

3. The indicating instrument of claim 1, wherein the illuminable indicating area is a surface area of the instrument panel and comprises an array of selectively firable light emitting elements disposed in the indicating area, the illuminable area when illuminated includes selected ones of the array of light emitting elements that are being fired at a particular time.

4. The indicating instrument of claim 3, wherein the light emitting elements comprise light emitting diodes, and each of the diodes having a first and a second operating state, wherein the diode is fired and illuminable in the first operating state.

5. The indicating instrument of claim 4, wherein each of the diodes is extinguished in the second operating state.

6. The indicating instrument of claim 4, wherein each of the light emitting diodes has at least a first and a second operating state, wherein the light emitting diode emits light of a first color in the first operating state and emits light of a second color in the second operating state.

7. The indicating instrument of claim 1, wherein the first speed relating to the vehicle fitted with the instrument is a preselected speed for the vehicle.

8. The indicating instrument of claim 7, wherein the second speed relating to another vehicle is the speed of another vehicle which is ahead of the vehicle fitted with the indicating instrument.

9. The indicating instrument of claim 1, wherein the second speed relating to another vehicle is the speed of another vehicle which is ahead of the vehicle fitted with the indicating instrument.

10. The indicating instrument of claim 1, wherein the illuminable indicating area has one side with the first demarcating edge which forms an indicating edge denoting a preselected speed for the vehicle with the instrument, and the indicating area has a second side with the second demarcating edge which forms an indicating edge to indicate the speed of the other vehicle.

11. The indicating instrument of claim 10, wherein the other indicating edge indicates the speed of a vehicle traveling in front of the vehicle fitted with the instrument.

12. The indicating instrument of claim 2, wherein the illuminable indicating area comprises a circular arc shaped strip on the instrument panel, the arc shaped strip having curved sides and having short sides, the short sides of the indicating area defining the demarcating edges, and the demarcating edges are adjacent the speed scale.

* * * * *